(12) United States Patent
Carter et al.

(10) Patent No.: US 8,490,018 B2
(45) Date of Patent: Jul. 16, 2013

(54) PRIORITIZATION OF CHOICES BASED ON CONTEXT AND USER HISTORY

(75) Inventors: Marc Stanley Carter, Bournemouth (GB); David J. Clark, Winchester (GB); Doina Klinger, Winchester (GB); Lucas W. Partridge, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/620,079

(22) Filed: Nov. 17, 2009

(65) Prior Publication Data

US 2011/0119628 A1 May 19, 2011

(51) Int. Cl.
*G06F 3/048* (2006.01)
(52) U.S. Cl.
USPC .............................. 715/812; 706/12; 715/825
(58) Field of Classification Search
USPC ....... 706/12; 715/825, 810, 744, 812; 368/10; 705/14; 702/182; 707/5
See application file for complete search history.

(56) References Cited

U.S. PATENT DOCUMENTS

| | | | |
|---|---|---|---|
| 5,666,502 | A | 9/1997 | Capps |
| 7,343,365 | B2 | 3/2008 | Farnham et al. |
| 2001/0028603 | A1* | 10/2001 | Shimazu .......................... 368/10 |
| 2002/0143759 | A1* | 10/2002 | Yu .................................... 707/5 |
| 2006/0004680 | A1* | 1/2006 | Robarts et al. ................... 706/12 |
| 2006/0095864 | A1* | 5/2006 | Mock et al. ..................... 715/810 |
| 2007/0050359 | A1 | 3/2007 | Anderson |
| 2007/0061735 | A1* | 3/2007 | Hoffberg et al. ............... 715/744 |
| 2007/0280006 | A1* | 12/2007 | Aoyama et al. ........... 365/189.01 |
| 2008/0306711 | A1* | 12/2008 | Bansal ........................... 702/182 |
| 2009/0113346 | A1* | 4/2009 | Wickramasuriya et al. .. 715/825 |
| 2009/0265236 | A1* | 10/2009 | Schultz et al. ................... 705/14 |

OTHER PUBLICATIONS

Maier, et al., "Infotop—A Shared-context Information Workspace," 8 pages.
Chen, et al., "An Intelligent Broker for Context-Aware Systems," 2 pages.
H. Chen, "An Intelligent Broker Architecture for Context-Aware Systems," Jan. 2003, 44 pages.

* cited by examiner

*Primary Examiner* — Matt Kim
*Assistant Examiner* — Tuan S Nguyen
(74) *Attorney, Agent, or Firm* — Thomas E. Lees, LLC

(57) ABSTRACT

A method comprises identifying, by a computing device, a current context of a computer program; identifying, by the computing device, any related contexts of the computer program that are related to the current context; determining, by the computing device, association relationships between the current context and the related contexts; determining, by the computing device, a user history of menu choice selection with respect to the current context; updating, by the computing device, the user history based on a user menu choice selection and the association relationships; determining, by the computing device, weighted menu choices for a second context of the computer program based on the user history; and presenting, by the graphic user interface, the weighted menu choices for selection by the user in the second context.

20 Claims, 7 Drawing Sheets

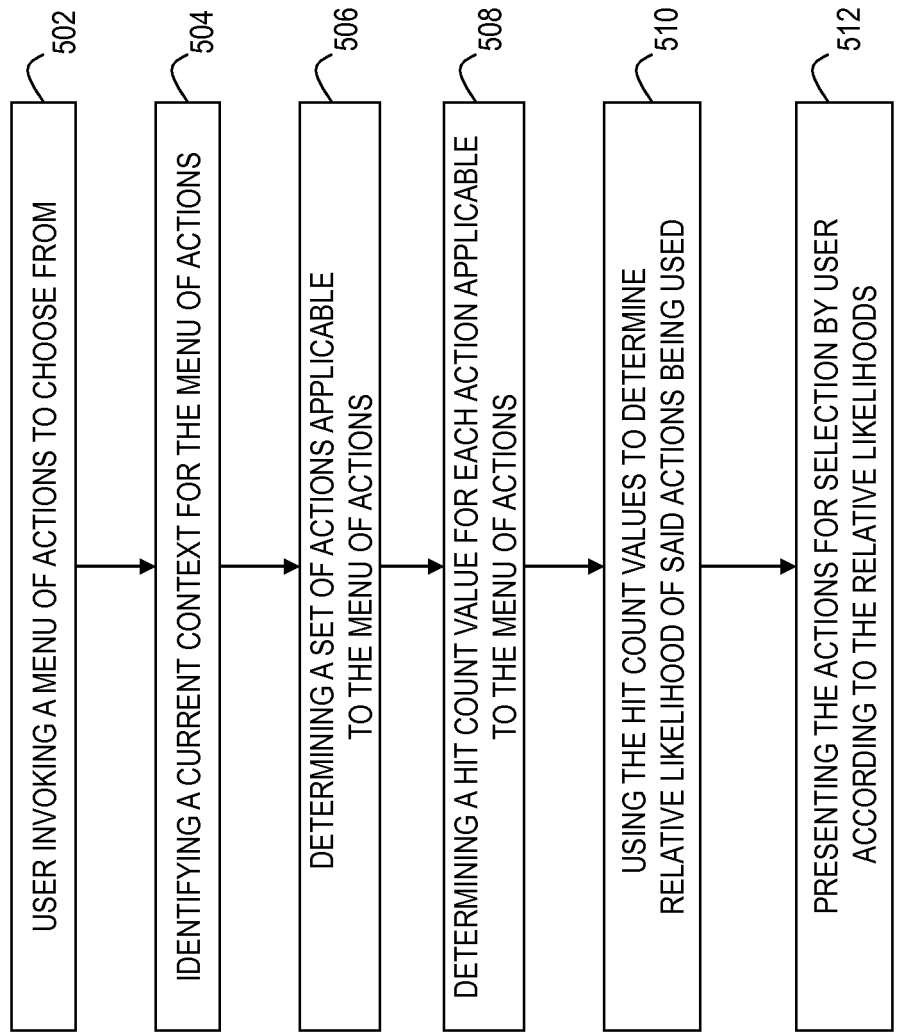

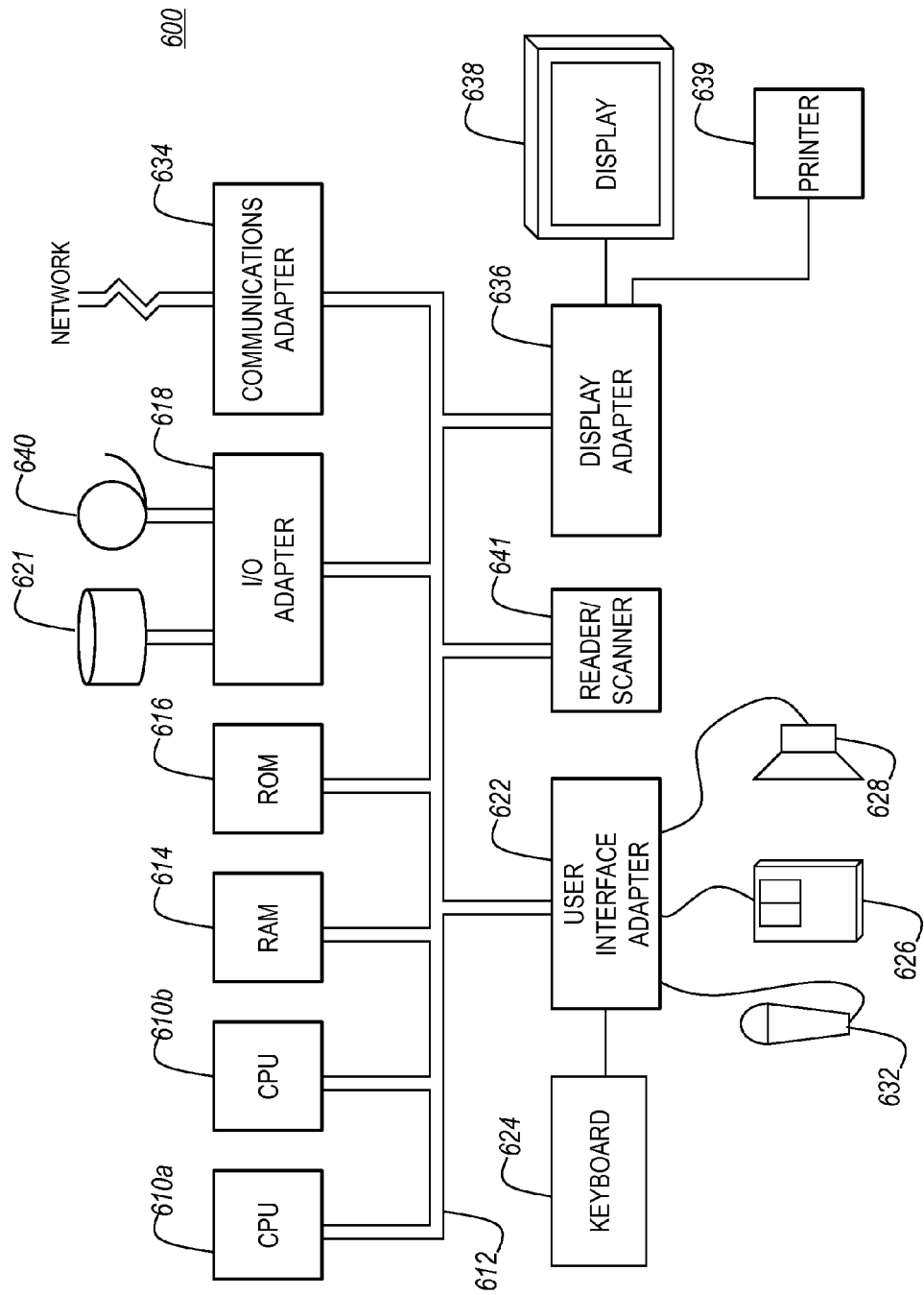

PRIORITIZATION OF CHOICES BASED ON CONTEXT AND USER HISTORY

BACKGROUND

The embodiments of the invention generally relate to the automatic presentation of a customized list of choices in an application menu or dialog system wherein the choices are limited by the definition of multiple contexts.

There are many circumstances in which computer systems need to present users with choices, and sometimes those choices can be numerous and diverse. These choices may be actions, options, or objects applicable to the task the user is completing. Many applications such as Microsoft Word (R), IBM Lotus Notes (R), Eclipse (R), etc, provide a wealth of actions arranged on menu bars, toolbars and contextual menus as well as shortcut keys to increase user speed and productivity. While these commands are undoubtedly useful, the user needs to search through the menus for those that are relevant for the current task. In addition, there is a limit to how many shortcuts a user can remember and it is a matter of personal taste which actions provide the most productivity gains.

Operating systems and environments often need to present folders or files as part of a representation of a file system, storage media, printers, other peripheral devices, or resources. Software will sometimes wish to present "recently-used" files or folders or applications to assist user selection. Many dialogues with the user involve the presentation of an extensive list from which a choice must be made. In each case the desire of the user interface designer to assist the user by presenting a list rather than requiring unprompted entry is frequently offset by the length of the list, the need to search through it, and the difficulty the user may experience in recognizing the choice they need among potentially unfamiliar alternatives.

In some cases, a "default" option may be used (e.g., a "default" printer can be identified). However, there may not be one single printer that is appropriate as the "default" in all circumstances. The "default" choice also needs to be aware of context and history in order to be effective, and is therefore really just a special case of filtering or prioritizing a long list.

Various strategies exist for addressing the issue of user menu selection.

The utility of conventional approaches is generally limited by various factors: the scope at which context awareness is applied is limited to a particular application or function; the contexts which are used are often simple and only take into account limited factors (e.g. application, current selection) and these do not enable the most useful options to be reliably identified; and, although contexts may sometimes be combined (for example, when providing contextual menus for multiple selections of objects to which different actions apply), the user's history of choices in one context does not affect other contexts, even if those other contexts are very similar.

Some systems, including some of those listed above (especially auto-compacting menus), use "hit-counting", in which the system records how often a particular action or choice has been selected. However, this tends to accentuate the problems of context and scope. In particular, hit counts maintained for the immediate context alone do not influence similar choices elsewhere, and hit counts maintained globally lose context relevance and therefore lead to inappropriate choices being presented.

An example of this is the "Save As" dialog problem which affects many applications. If an application retains its own memory of the last "Save As" location, this doesn't apply to similar applications. Conversely, a globally maintained last "Save As" location presents unsuitable folders for the file being saved.

BRIEF SUMMARY

One embodiment herein comprises a computer-implemented method of prioritizing choices for selection by a user presented by a computer program in a graphic user interface. The method comprises identifying, by a computing device, a current context of a computer program; identifying, by the computing device, any related contexts of the computer program that are related to the current context; determining, by the computing device, association relationships between the current context and the related contexts; determining, by the computing device, a first user history of menu choice selection with respect to the current context; determining, by the computing device, additional user histories of menu choice selections with respect to the related contexts; updating, by the computing device, the first user history and the additional user histories based on a user menu choice selection and the association relationships; determining, by the computing device, weighted menu choices for a second context of the computer program based on one of the first user history and the additional user histories; and presenting, by the graphic user interface, the weighted menu choices for selection by the user in the second context.

Another embodiment herein comprises a computer-implemented method of prioritizing choices for selection by a user presented by an application in a graphic user interface. The method comprises identifying the user and a first computer program using a computer; determining a current context of the first computer program using the computer, wherein the current context comprises one of a logical context, a personal context, and an environmental context; identifying related contexts of the first computer program that are related to the current context using the computer; determining association relationships between the related contexts and the current context using the computer; determining a user history of menu choice selection with respect to the first computer program using the computer; updating, by the computing device, the user history based on a user menu choice selection and the association relationships; determining weighted menu choices for a second computer program different than the first computer program using the computer based on the user history; and outputting the weighted menu choices using the computer for selection to the user in the second computer program.

An additional embodiment herein comprises a computer-implemented method of prioritizing choices for selection by a user presented by a computer program in graphic user interface. The method comprises identifying a current context of a computer program using a computer, wherein the current context comprises one of a logical context, a personal context, and an environmental context; identifying related contexts of the computer program that are related to the current context using the computer; determining association relationships between the related contexts and the current context using the computer; determining user choices associated with the current context using the computer; identifying association relationships between the current context and the related contexts using the computer; incrementing, using the computer, a first user history selection value for one of the user choices by a fixed value based on user selection; incrementing, using the computer, a second user history selection value for another of the user choices by the fixed value based on the association relationships between the current context and the identified contexts; determining a context weighting for the related contexts using the computer based on cumulative user history selection values for the current contexts; determining weighted menu choices for the computer program using the computer based on the cumulative user history; and outputting the weighted menu choices using the computer for selection to the user in the computer program.

Another embodiment herein comprises a computer program product for prioritizing choices for selection by a user presented by a computer program in a graphic user interface. The computer program product comprises a computer readable storage medium having computer readable program code embodied therewith. The computer readable program code is configured to perform a method comprising identifying a current context of a computer program; identifying any related contexts of the computer program that are related to the current context; determining association relationships between the current context and the related contexts; determining a first user history of menu choice selection with respect to the current context; determining additional user histories of menu choice selections with respect to the related contexts; updating the first user history and the additional user histories based on a user menu choice selection and the association relationships; determining weighted menu choices for a second context of the computer program based on one of the first user history and the additional user histories; and presenting the weighted menu choices for selection by the user in the second context.

BRIEF DESCRIPTION OF THE SEVERAL VIEWS OF THE DRAWINGS

The embodiments of the invention will be better understood from the following detailed description with reference to the drawings, which are not necessarily drawn to scale and in which:

FIG. 5A is a flowchart diagram of an exemplary embodiment of the invention;

FIG. 6 is a schematic diagram illustrating an exemplary hardware environment that can be used to implement the embodiments of the invention.

DETAILED DESCRIPTION

The embodiments of the invention and the various features thereof are explained more fully with reference to the non-limiting examples that are illustrated in the accompanying drawings and detailed in the following description.

One embodiment of the invention provides for a mechanism for filtering (in order to present a shorter list) or prioritizing (in order to present the choices in a helpful manner) available choices in a way that maximizes the likelihood of the choice that is wanted to be found quickly. This mechanism takes into account user history with respect to a context, where "context" is associated with particular aspects of a user, particular software users are operating, and the particular hardware/software/geographic environment users are within.

In some ways, the current "context" of a computer program or a computer application is the usage condition or operating state of the computer program. Most sophisticated computer programs can perform diverse tasks. The task (or tasks) that the computer program is currently processing changes depending upon the instruction of the user. Therefore, computer programs will have different usage conditions or operating states (different contexts) depending upon the inputs provided by the user. The embodiments herein present menu choices to the user that are different depending upon the different usage conditions or operating states of the computer program. Further, the embodiments herein alter the choices within such menus depending upon the history of menu selection made by the user in the past. In addition, the embodiments can weight the historical user menu choices and can apply the user's menu selection history associated with one computer program to customize the menus within a different computer program.

The embodiments of the invention enable the definition of multiple contexts, and introduce a context broker to support an application's presentation of choices.

Multiple Contexts

Existing approaches to presenting customized lists of choices are limited by the narrowing definitions of "context" that can be made. The context may reflect any aspect of the user and the user's interaction with the system that may affect the applicability or relevance of choices to be presented. These contexts may include: logical contexts (for example, the application software with which the user is working, or the particular view which the user has selected); personal contexts (for example, the user's preferences, level of experience, or other factors such as whether they are blind); and/or environmental contexts (for example, the day of the week, the user's location or work environment, i.e., site, or the hardware the user is interacting with).

Context Broker

Figure 1:
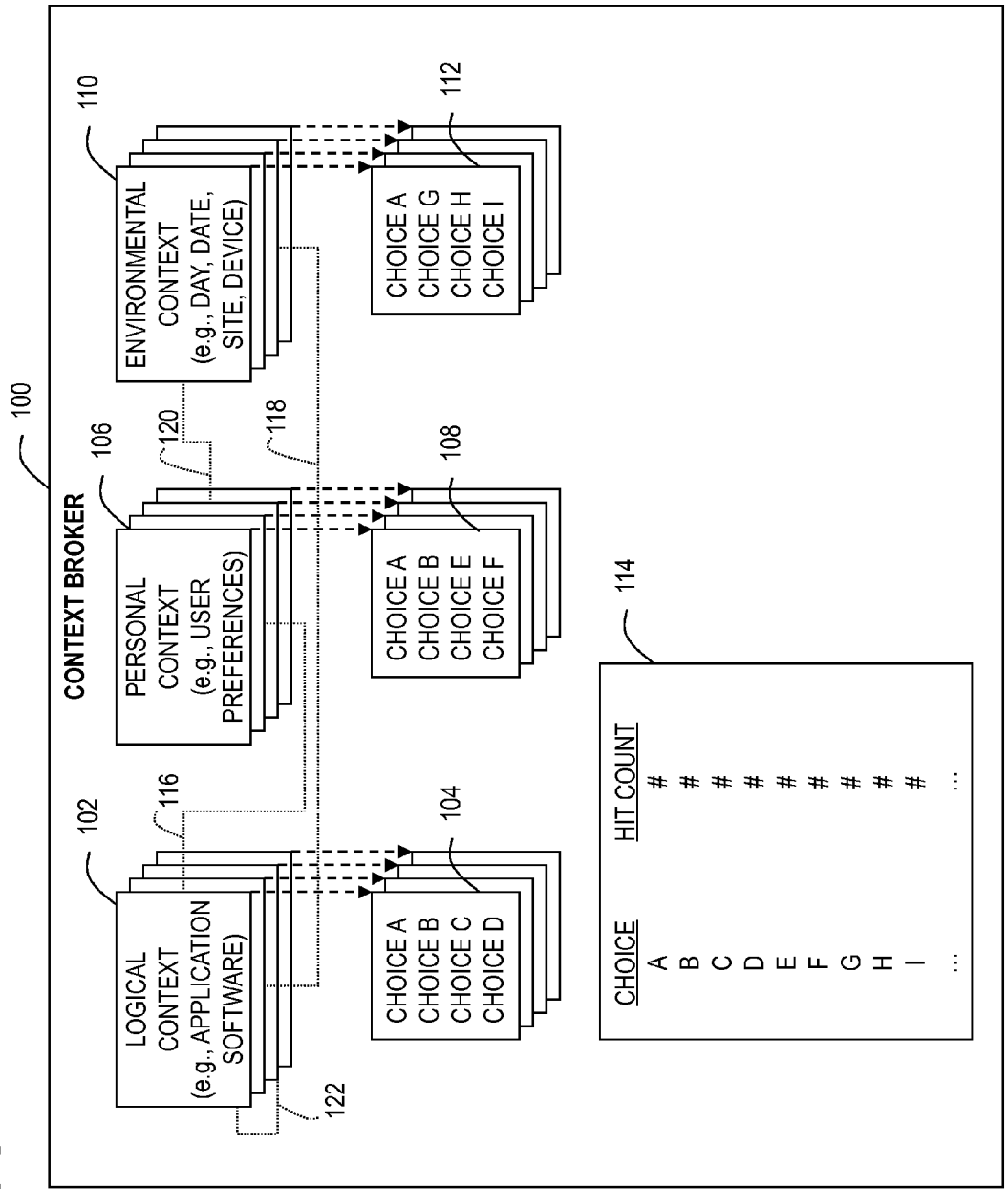
FIG. 1 is a schematic illustration of an exemplary embodiment of the invention including a context broker.

FIG. 1 illustrates a context broker 100, preferably a system resource in order to enable contexts to be defined and user history to be maintained across applications and environments. The context broker may also be limited to a particular scope (e.g., within a single application).

The context broker provides a means for an application or component to define contexts that are applicable to the application or component. These contexts may be: logical contexts 102 (for example, the application software which the user is working with, or the particular view which the user has selected); personal contexts 106 (for example, the user's preferences, level of experience, or other factors such as whether they are blind); and/or environmental contexts 110 (for example, the day of the week, the user's location or work environment, i.e., site, or the hardware the user is interacting with). Each of these contexts may return a filtered list of choices, 104, 108 and 112, respectively.

The context broker provides a means to define and maintain association relationships between contexts. For example: line 116 represents a relationship between a logical context and a personal context; line 118 represents a relationship between a logical context and an environmental context; line 120 represents a relationship between a personal context and an environmental context; and line 122 represents a relationship between one logical context and another logical context. Likewise, each of the personal and environmental contexts may have relationships between different contexts within the same context group. This enables related contexts to be recognized along a path of an association relationship.

The context broker provides a means for an application or component to define a set of choices that are applicable to each context. For example, choice list 104 includes choices A-D, choice list 108 includes choices A-B and E-F, and choice list 112 includes choices A, G-I. The context broker also provides a means for an application or component to determine and bind to a "current" context.

The context broker provides a means to record user history of choice selection. The information provided to the broker should include the "current" context, the choice that has been selected, the time of the selection, and the identity of the user, (this may include operation system identified user, authenticated application userID, web site registered user, etc.).

The context broker provides a method, (or multiple methods), to enable user history in one context to contribute to related contexts appropriately (e.g., with weighting). The context broker also provides a means for an application or component to obtain the list of weighted choices applicable to the current context and their priorities.

Figure 2:
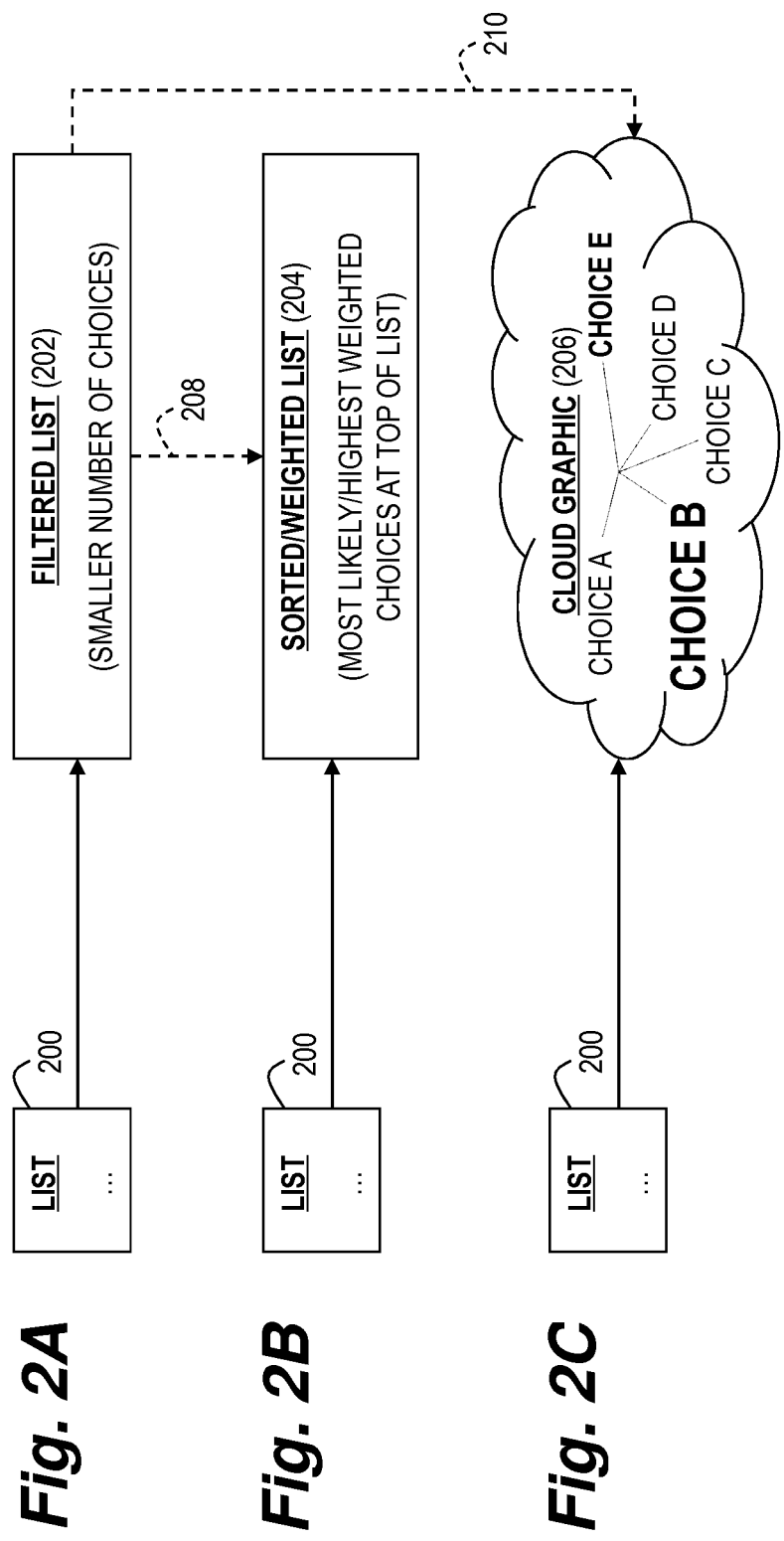
FIG. 2A is a schematic illustration of an exemplary embodiment of the invention including a filtered list.
FIG. 2B is a schematic illustration of an exemplary embodiment of the invention including a sorted/weighted list.
FIG. 2C is a schematic illustration of an exemplary embodiment of the invention including a cloud list.

An application or component can connect to a context broker and use it to obtain lists of weighted choices appropriate for the user's current context. The application or component can then use this information to present the list of choices appropriately. As illustrated in FIGS. 2A, 2B and 2C, this may mean presenting the choices in a list 200 as: a filtered list 202 as illustrated in FIG. 2A, (i.e., using the weightings to select a smaller number of choices to present); a sorted list 204 as illustrated in FIG. 2B, (i.e., using the weightings to put the most likely choices at the top of the list), or a cloud graphic 206 as illustrated in FIG. 2C, (e.g., using the weightings to set text size and/or color or other embellishments to highlight the most likely choices: i.e., in this illustration, CHOICES A-E). In the alternative, a combination of the foregoing means of presentation may be included. For example, a subset of the options could first be determined (202) and then these options presented 208 in the form of the sorted list (204), or alternatively, presented 210 as a cloud graphic (206) with the most likely options highlighted the most.

The context broker 100 stores the defined contexts, the related contexts, the choices applicable to each context, and hit count history/weightings for the choices, for example, A-I, in each context, and this can be done in a suitable data structure 114 (on a small scale) or with a suitable database schema (on a larger scale). Note that there will be one table of hit count values for each context, with a hit count value assigned to all the choices or actions available to the user in that context. When the user starts the application (or, more specifically, uses the context) for the very first time the hit counts are initialized to zero for all choices. As an alternative to having one table of hit counts per context it is possible to have a single table of hit counts for all contexts, with one dimension (row or column) representing all the choices available over all the contexts, and the other dimension (column or row respectively) representing all the contexts. However this structure is likely to be less efficient than maintaining one table per context because a single table is likely to be populated with many null (empty) values where the actions do not apply in the corresponding contexts.

The simplest method for recording hit counts is to increment only the hit count for the selected choice in the current context. (In the one-table-of-hit-counts-per-context approach mentioned above this means that the hit count for a given action is only ever updated in a single table at a time.) This gives simple hit-counting of choices with no significant advantages over existing solutions such as the auto-compacting menus.

A first extension of the method is to increment the hit count for the selected choice in all contexts in which the choice appears. (In the one-table-of-hit-counts-per-context approach mentioned above this would be equivalent to incrementing the hit count for that action by the same amount in all the tables for which that action is found.) This enables all participating applications and components, in all contexts, to respond to the user history. For example, if the same choice appeared in different applications, the hit-counting may be used by both applications to adjust the hit count value of that action in those respective contexts. Alternatively stated, hit counts of user menu selection items that occur while the user is operating a graphic user interface of one computer program alter the hit count value of equivalent user menu selection items by the same amount in a graphic user interface of a different computer program.

A more sophisticated method takes account of the relationships between contexts to apply user history. In the one-table-of-hit-counts-per-context approach mentioned above this would be equivalent to incrementing the hit count for that action by different amounts in some or all of the tables for which that action is found. The hit count for that action is incremented by a larger amount in contexts that are determined to be closely related to the current context than the hit count for the same action in contexts determined to be less closely related to the current context. One example of such a method is given below.

A Weighted User History Recording Method

Figure 3:
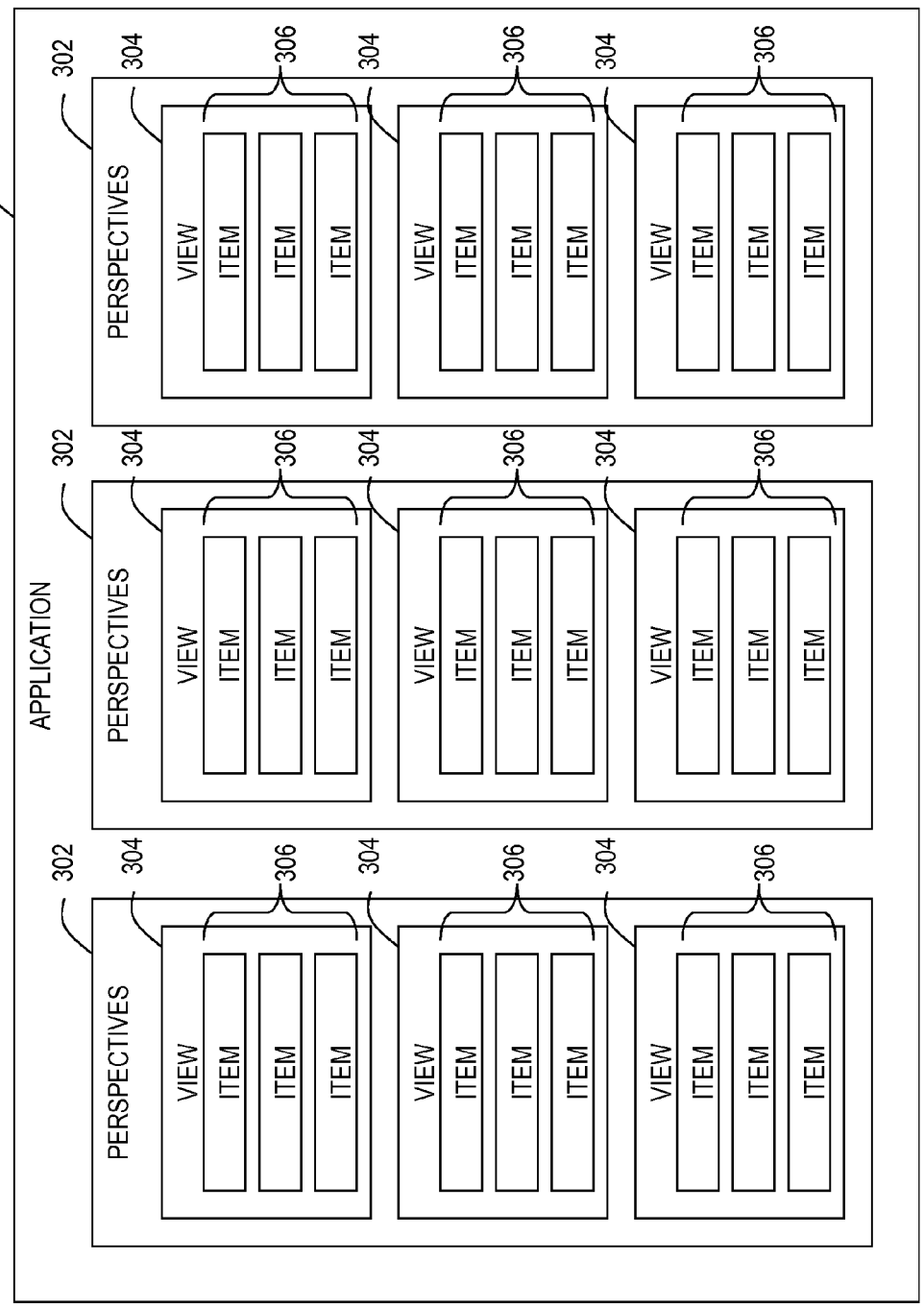
FIG. 3 is a schematic illustration of an exemplary embodiment of the invention including an application including defined contexts.

An application or component has defined a number of contexts with a hierarchical relationship. This models the logical contexts in many common applications (e.g., application, window, view, zone, selection). With respect to FIG. 3, for example, within the application 300 are multiple perspectives 302, and within each perspective 302 are entities that can be worked with, and there are multiple views 304 that can be opened, and multiple items 306 that can be selected within the view.

In a hierarchical relationship, each context is related to its "child" contexts and to its "parent" context. When a user choice is recorded, the weighting mechanism applies a maximum hit count increment of 5 for the selected choice in the current context; and also a hit count equal to 5 minus the number of hops away from the current context that another context lies in the tree of contexts to the selected choice in other contexts, subject to a minimum of zero, so that the hit count for the selected choice in contexts 5 or more hops away from the current context is simply not incremented. The maximum hit count increment may be any user or system selected value.

Figure 4:
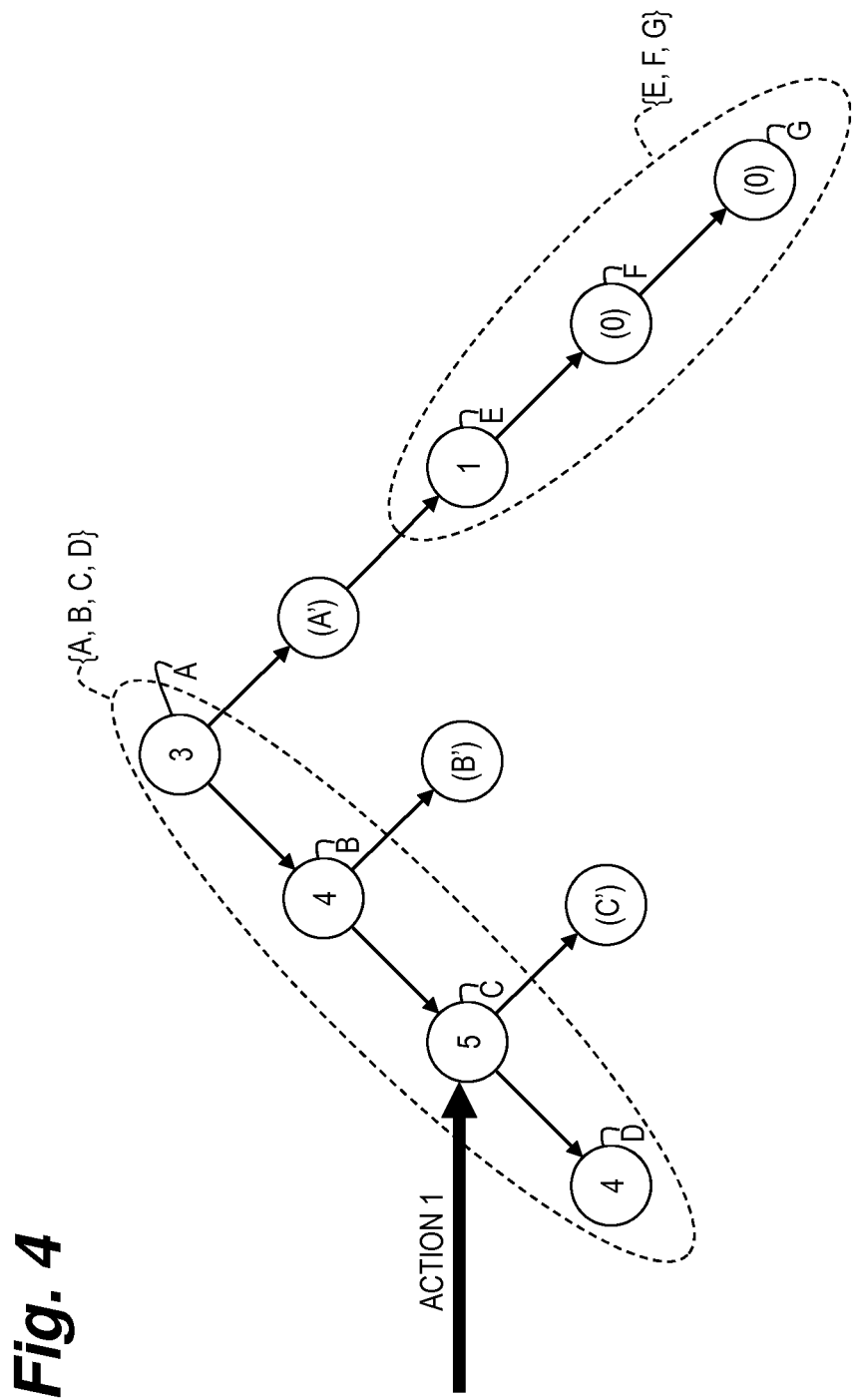
FIG. 4 is a schematic illustration of an exemplary embodiment of the invention.

An example of such a weighted context-based hit counting method, as applied to an exemplary set of hierarchically related contexts, is illustrated in FIG. 4. Each node A-G and A'-C' represents a different context, with arrows pointing from parent contexts to child contexts, for example, from node A to B, and A to A'. The dotted lines enclose all the contexts in which a particular choice, say Action 1, is applicable, for example, contexts {A, B, C, D}, and contexts {E, F, G}. The thick arrow labeled "Action 1" indicates the current context when the user invokes "Action 1" on context node C. The hit count for Action 1 in context node C is therefore incremented by a value of 5, shown on the diagram by the centrally located number in each node. The hit counts for Action 1 in the other adjoining contexts are incremented by the values shown in FIG. 4 according to their "distance" from the current context. For example, the hit count for the nodes B, D and C', immediately proximate to the selected node C are incremented by a value of 4; whereas the hit count for node A, located two hops away from node C in the tree of contexts, is only incremented by 3 (i.e., 5−2). Likewise, the hit count for Action 1 in node E, 4 hops away from node C, is incremented by a value of 1 (=5−4). The hit counts for Action 1 in nodes F and G are not incremented since they are more than five hops or association links away from the activated node ('current context') where "Action 1" took place. Hit counts for Action 1 are not maintained for nodes A'-C' since Action 1 is not applicable to those contexts (otherwise they would be located within the dotted line). Returning to the single table of hit counts for all actions and contexts, the hit counts for Action 1 in contexts A'-C' would be shown as null (empty).

If this application uses a contextual menu with the choices prioritized according to the weightings obtained from the context broker, then the above interaction will cause the weighting of Action 1 in the current context C to be increased by the largest amount, while the weighting of Action 1 in other contexts (A, B, D, E) is increased less, and in some contexts (F and G) are not increased at all. Thus, if Action 1 is repeatedly selected in one view within the application (for example), while another Action 2, (not shown), is repeatedly selected in another view, Action 1 is likely to rise to the top of the prioritized list of available actions in the first view while Action 2 will rise to the top in the second view.

Association Relationships

Although many contexts may be organized into hierarchical relationships, see FIG. 1, as illustrated by the "stack" of contexts underlying each context 102, 106 and 110, respectively, more connections between contexts as illustrated by lines 116, 118, 120 and 122, will enable more effective application of the user history data. For example, when presenting folder choices in a "Save As" or "Load" dialog, the save/load action and the file type should constitute a context, and be related to other contexts that relate to save/load actions of the same file type in other parts of the application or in other applications. In this way, saving an image file (for example) from one context can help prioritize the folders presented when loading an image file in another application, rather than presenting an unrelated "default" folder location. To enable contexts to be related between different applications, the context broker may provide a dictionary of standard common actions and types.

Presentation of the Filtered/Prioritized Choices

The following examples illustrate how the list of weighted choices and their priorities, as obtained from the context broker, may be used in various scenarios.

In a menu system, the choices may be menu actions. A menu of "favorite actions" may be presented, in which the highest weighted menu actions are presented in decreasing order of weight, as illustrated by the sorted/weighted list 204 of FIG. 2B. For a "Save As" dialog, the choices may be folder locations. The most likely (highest weight) folder may be used as the "default" folder location, and a list of "suggested locations" may be included at one side of the dialog and may feature the next 4 or 5 most highly weighted folder locations for example.

In a Web 2.0 tagging system, the choices may be tags. A tag cloud, as illustrated in FIG. 2C as cloud graphic 206, can be presented with the weighting of each tag is reflected in the size/boldness of each tag in the cloud. For example, "CHOICE B" is the largest bold font presented as the largest weight choice, whereas "CHOICE E" is the second largest weight choice and is merely bolded and the same font size issued for all the remaining choices. In this case, a user history weighting method may be used which increments the weighting (by smaller amounts) for related tag words: for example, selecting a tag "football" increases the hit count for the "football" tag maximally, but might also increment the hit counts for tags "sport," "ball games," "outdoor pursuits," etc., weighted by similarity.

In "recently used" lists (files, applications, etc.), the choices may be files or folders or applications. The highest weighted choices can be presented in decreasing order of weight, or in MRU (Most Recently Used) order.

In a web page, the choices may be links. A list of "likely links" may be presented, and by applying the user history across related contexts, (web pages from the same domain, for example), it becomes possible to customize the likely links list even if the particular page has never been visited before. This may be especially useful for a non-visual browser (e.g., screen reader used by blind computer users) to make link selection more efficient.

When printing, the choices may be available printers. The most highly weighted printer may be used as the "default" printer, but if a list of printers is requested they can be presented in order of decreasing weight. Paper size and color or black and white printing choices might be used as contextual inputs for presenting the default printer. For example the user might have one default printer for B&W printing, a different default printer for color, and yet another for printing a specific size media output.

FIG. 5A illustrates a flowchart when a user invokes a menu. First, the user invokes a menu of actions to choose from 502. The system then identifies a current context for the menu of actions 504, and thereafter determines a set of actions applicable to the menu of actions 506. A hit count value is determined for each of the actions applicable to the menu of actions 508. The hit count value is then used to determine the relative likelihood of the actions being used 510. The actions are then presented to the user for selection by the user according to the determined relative likelihood of the actions being used by the user 512.

Figure 5B:
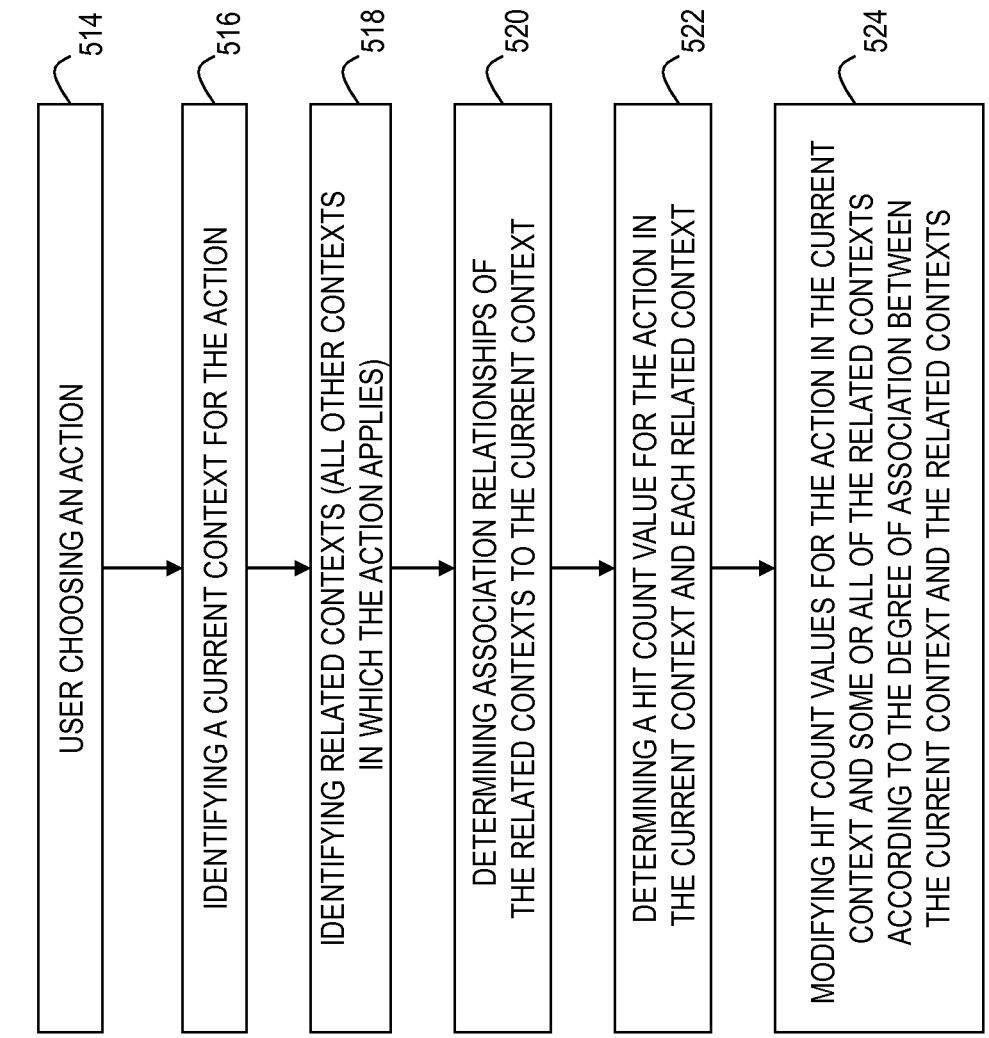
FIG. 5B is a flowchart diagram of an exemplary embodiment of the invention.

FIG. 5B illustrates a flowchart describing what happens when a user selects one of the actions from the menu presented to the user from reference number 512. First, the user chooses an action presented in the menu from FIG. 5A at reference number 512. The system identifies the current context of the action that has been chosen 516. The system then identifies related contexts, that is, all other contexts in which the chosen action applies 518. Association relationships are determined between the related contexts and the current context 520. A hit count value is determined for the selected action in the current context and also for the same action in each related context 522. Finally, the hit count value is modified for the selected action in the current context, and, for either some or all of the related contexts, the hit count values for the same action are modified according to the degree of association between the current context and each related context(s) 524.

An alternative to the embodiment of FIG. 5 is first, before the user does anything, the application developer needs to: (1) Define contexts, (2) Define relationships between contexts, and (3) Define a method for modifying the hit count values for actions within a context according to the relationships between the contexts. Hit counts for all contexts are initialized to zero when the application is distributed to users. An alternative embodiment may include when the application is started by the user for the very first time, the hit counts for all the actions within it are updated by the context broker based on the hit counts for any of the same actions defined in related contexts outside the application. This effectively personalizes the application's menu system before the user will have used it. Now the user gets to use the application. At any moment the current context must be known. The user's action is identified when he/she chooses a menu option. The hit count for that action is updated in the current context, and all related contexts, according to the method defined above at (3). When the user wants to see a list of choices in a particular context, the choices are presented (ordered/filtered/weighted as per FIG. 2) based on their hit count values in the current context.

The embodiments of the invention can take the form of an entirely hardware embodiment, an entirely software embodiment or an embodiment including both hardware and software elements. One embodiment of the invention can be implemented in software, which includes but is not limited to firmware, resident software, microcode, etc.

As will be appreciated by one skilled in the art, an embodiment of the invention may be embodied as a system, method or computer program product. Accordingly, an embodiment of the invention may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, an embodiment of the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of an embodiment of the invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various embodiments of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A representative hardware environment for practicing the embodiments of the invention is depicted in FIG. 6. System 600 illustrates a typical hardware configuration which may be used for implementing the inventive system and method of prioritizing choices for selection by a user presented in an application. The configuration has preferably at least one processor or central processing unit (CPU) 610*a*, 610*b*. The CPUs 610*a*, 610*b* are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting an information handling system to a data processing network, the Internet, and Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

Thus, this aspect of the embodiment of the invention is directed to a programmed product, comprising signal-bearing media tangibly embodying a program of machine-readable instructions executable by a digital data processor incorporating the CPU 610 and hardware above, to perform the method of an embodiment of the invention.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of any embodiments of the invention. As used herein, the singular forms 'a', 'an' and 'the' are intended to include the plural forms as well, unless the context clearly indicates otherwise. It will be further understood that the terms 'comprises' and/or 'comprising,' when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the invention has been presented for purposes of illustration and description, but is not intended to be exhaustive or limited to the embodiments of the invention in the form disclosed. Many modifications and variations will be apparent to those of ordinary skill in the art without departing from the scope and spirit of the embodiments of the invention. The embodiment was chosen and described in order to best explain the principles of the embodiments of the invention and the practical application, and to enable others of ordinary skill in the art to understand the embodiments of the invention for various embodiments with various modifications as are suited to the particular use contemplated.

What is claimed is:

1. A computer-implemented method of prioritizing choices for selection by a user, said method comprising:
    identifying, by a computing device, a current context of a computer program;
    determining, by said computing device, at least one related context that forms a hierarchical relationship with said current context;
    determining, by said computing device, whether there are any contexts that forms an association relationship with said current context, where each association relationship is a predetermined relationship established between contexts that is independent from the hierarchical relationship;
    determining, by said computing device, a user history of weighted menu choice selections with respect to said current context, each selection having a weight corresponding to a relative likelihood of the associated menu choice selection being selected by a user;
    receiving an indication that a user has made a menu choice selection based upon said menu choice selections of said user history associated with said current context;
    updating, by said computing device, said user history of said current context by updating the weight associated with said user's menu choice selection;
    updating, by said computing device, an associated user history of related contexts within said hierarchical relationship in which the selected user's menu choice also exists, by updating a weight associated with said user's menu choice selection in that user history by a predetermined value, wherein the value is based upon a distance from said current context within said hierarchical relationship; and
    updating, by said computing device, an associated user history of each related context that forms an association relationship with said current context in which the selected user's menu choice also exists by updating a weight associated with said user's menu choice selection in that user history;
    identifying, by a computing device, a second context of said computer program where the second context is set to the current context;
    determining, by said computing device, weighted menu choices in an associated user history of said second context of said computer program; and
    creating for presentation, a list of said weighted-menu choices for selection by said user in said second context.

2. The computer-implemented method of prioritizing choices according to claim 1, further comprising filtering said weighted menu choices to select a smaller number of weighted menu choices for the list of said weighted menu choices.

3. The computer-implemented method of prioritizing choices according to claim 1, further comprising sorting said weighted menu choices to order most likely choices at a top of the list of said weighted menu choices.

4. The computer-implemented method of prioritizing choices according to claim 1, wherein said current context comprises one of a logical context, a personal context and an environmental context,
    wherein said logical context corresponds to one of an application perspective, view and item,
    wherein said personal context corresponds to one of a user preference, a level of experience, and a user physical trait, and
    wherein said environmental context corresponds to one of a day of the week, a user location, a user work environment and hardware said user is utilizing.

5. The computer-implemented method of prioritizing choices according to claim 1 further comprising presenting, by a graphic user interface, the list of said weighted menu choices.

6. A computer-implemented method of prioritizing choices for selection by a user, said method comprising:
    identifying a current context of said first computer program using said computer, wherein said current context comprises one of a logical context, a personal context, and an environmental context;
    identifying at least one related context that forms a hierarchical relationship with said current context;
    identifying whether there are any related contexts that forms an association relationship with said current context, where the association relationship is a predetermined relationship established between contexts that is independent from the hierarchical relationship;

determining a first user history of menu choice selections with respect to said current context, each selection having a weight corresponding to the relative likelihood of the associated menu choice selection being selected;

determining, by said computing device, additional user histories of menu choice selections with respect to said related contexts, each selection having a weight;

receiving an indication that a user has made a menu choice selection based upon said weighted menu choice selections of said first user history associated with said current context;

updating, by said computer device, said first user history by updating the weight associated with said user's menu choice selection;

updating, by said computing device, ones of said additional user histories of related contexts within said hierarchical relationship in which the selected user's menu choice also exists, by updating a weight associated with said user's menu choice selection in that user history by a predetermined value, wherein the value is based upon a distance from said current context within said hierarchical relationship;

updating, by said computing device, ones of said additional user histories of each related context that forms an association relationship with said current context in which the selected user's menu choice also exists by updating a weight associated with said user's menu choice selection in that user history;

identifying, by a computing device, a second context of said computer program where the second context is set to the current context;

determining weighted menu choices in an associated user history of said second context and outputting said weighted menu choices of said second context.

7. The computer-implemented method of prioritizing choices according to claim 6, wherein said identifying of said current context is based on one of user identification, application identification and a specific time.

8. The computer-implemented method of prioritizing choices according to claim 6, wherein said determining said user history of menu choice selection further comprises providing information on one of said current context of said first computer program, a choice that has been selected, a time of selection, and an identity of said user.

9. The computer-implemented method of prioritizing choices according to claim 8, wherein said identifying of said user comprises obtaining information on one of an operating system of said computer, an authenticated application user identification, and a web site user registration.

10. The computer-implemented method of prioritizing choices according to claim 6, said logical context corresponding to one of an application perspective, view and item;

said personal context corresponding to one of a user preference, a level of experience, and a user physical trait; and said environmental context corresponding to one of a day of the week, a user location, a user work environment and hardware said user is utilizing.

11. A computer-implemented method of prioritizing choices for selection by a user, said method comprising:

identifying a current context of a computer program using a computer, wherein said current context comprises one of a logical context, a personal context, and an environmental context;

determining at least one related context that forms a hierarchical relationship with said current context;

determining whether there are any contexts that form an association relationship with said current context, where the association relationship is a predetermined relationship established between contexts that is independent from the hierarchical relationship;

using said computer:

determining a user choice associated with said current context using said computer;

incrementing, using said computer, a value for said user choice by a fixed value;

incrementing, using said computer, a value for said user choice in identified related contexts within said hierarchical relationship in which the selected user choice also exists, by an amount based on distances from said current context to said identified related contexts within said hierarchical relationship;

incrementing, using said computer, a value for said user choice by a fixed value for each related context that forms an association relationship with said current context in which the user choice also exists;

determining weighted menu choices for said computer program using said computer based on said cumulative user history; and outputting said weighted menu choices using said computer for selection to said user in said computer program.

12. The computer-implemented method of prioritizing choices according to claim 11, further comprising filtering said weighted menu choices to select a smaller number of weighted menu choices to present for selection to said user.

13. The computer-implemented method of prioritizing choices according to claim 11, further comprising sorting said weighted menu choices to order most likely choices at a top of a list to present for selection to said user.

14. The computer-implemented method of prioritizing choices according to claim 11, further comprising graphically displaying said weighted menu choices and differentiating said weighted menu choices by changing at least one of a text size, a text color, a font and a text style of said weighted menu choices.

15. The computer-implemented method of prioritizing choices according to claim 11, said logical context corresponding to one of said application perspective, view and item;

said personal context corresponding to one of a user preference, a level of experience, and a user physical trait; and said environmental context corresponding to one of a day of the week, a user location, a user work environment and hardware said user is utilizing.

16. A non-transitory computer-readable storage medium with an executable program for prioritizing choices for selection by a user stored thereon, wherein the program instructs a processor to perform:

identifying a current context of a computer program;

determining at least one related context that forms a hierarchical relationship with said current context;

determining whether there are related contexts that form an association relationship with said current context, where the association relationship is a predetermined relationship established between contexts that is independent from the hierarchical relationship;

determining a user history of weighted menu choice selections with respect to said current context, each weight corresponding to the relative likelihood of the associated menu choice selection being selected by a user;

receiving an indication that a user has made a menu choice selection based upon said weighted menu choice selections of said user history associated with said current context;
updating said user history of said current context by updating said weight associated with said user's menu choice selection;
updating an associated user history of related contexts within said hierarchical relationship in which the selected user's menu choice also exists, by updating a weight associated with said user's menu choice selection in that user history by a predetermined value, wherein the value is based upon a distance from said current context within said hierarchical relationship;
updating an associated user history of each related context that forms an association relationship with said current context in which the selected user's menu choice also exists by updating a weight associated with said user's menu choice selection in that user history;
identifying, by a computing device, a second context of said computer program where the second context is set to the current context;
determining weighted menu choices for said second context of said computer program based on said user history; and
creating for presentation, a list of said weighted menu choices for selection by said user in said second context.

17. The non-transitory computer-readable storage medium according to claim 16, wherein the program further instructs the processor to perform filtering said weighted menu choices to select a smaller number of weighted menu choices for the list of said weighted menu choices.

18. The non-transitory computer-readable storage medium according to claim 16, wherein the program further instructs the processor to perform sorting said weighted menu choices to order most likely choices at a top of the list of said weighted menu choices.

19. The non-transitory computer-readable storage medium according to claim 16, wherein said current context comprises one of a logical context, a personal context and an environmental context,
    wherein said logical context corresponds to one of an application perspective, view and item,
    wherein said personal context corresponds to one of a user preference, a level of experience, and a user physical trait, and
    wherein said environmental context corresponds to one of a day of the week, a user location, a user work environment and hardware said user is utilizing.

20. The non-transitory computer-readable storage medium according to claim 16, wherein the program further instructs the processor to perform presenting, by a graphic user interface, the list of said weighted menu choices.

* * * * *